(12) United States Patent
Lavoie

(10) Patent No.: US 7,604,827 B1
(45) Date of Patent: Oct. 20, 2009

(54) COILED DOUGH PACKAGE

(76) Inventor: Robbie L. Lavoie, 60 Park Hill Ct., Strafford, MO (US) 65757

( * ) Notice: Subject to any disclaimer, the term of this patent is extended or adjusted under 35 U.S.C. 154(b) by 783 days.

(21) Appl. No.: 11/078,534

(22) Filed: Mar. 12, 2005

(51) Int. Cl.
*A21D 10/02* (2006.01)

(52) U.S. Cl. .................. 426/128; 426/112; 426/119

(58) Field of Classification Search .............. 426/112, 426/394, 124, 128, 119, 500, 501, 502, 496, 426/115, 392; 30/315, 316, 299, 123; 220/801, 220/805, 789, 791
See application file for complete search history.

(56) References Cited

U.S. PATENT DOCUMENTS

| | | | | |
|---|---|---|---|---|
| 78,135 A | * | 5/1868 | Roof ............................ 7/111 |
| 1,873,716 A | * | 8/1932 | Nickerson ................... 53/419 |
| 1,988,058 A | * | 1/1935 | Traller ....................... 426/119 |
| 2,726,156 A | | 12/1955 | Armstrong ................. 426/128 |
| 3,338,722 A | * | 8/1967 | Long .......................... 426/120 |
| 3,605,648 A | * | 9/1971 | Petix et al. .................. 425/193 |
| 4,836,396 A | * | 6/1989 | Ancona et al. ............. 220/212 |
| 5,609,094 A | | 3/1997 | Ueno et al. ................ 99/450.2 |
| 2005/0084570 A1 | * | 4/2005 | Fairhurst .................... 426/128 |

* cited by examiner

Primary Examiner—Keith D Hendricks
Assistant Examiner—Jenna A. Watts
(74) Attorney, Agent, or Firm—Jonathan A. Bay

(57) ABSTRACT

A dough package has a sheet of dough and another sheet of a non-adhesive separator media cooperatively wound in a spiral assembly which is snugly fit inside a rigid container to protect the soft spiral assembly during the time that the package is an article of commerce. The sheet of separator media might be twice the size of the dough sheet in order to allow folding in about half into two flaps for covering both sides of the dough sheet while wound in the spiral. During domestic use, one flap might serve to separate the dough sheet from the countertop as the extra flap can be folded out to provide extra non-adhering working space. Cookie cutters, edible complements, and rolling pin handles might also be optionally prestocked with the dough package.

11 Claims, 6 Drawing Sheets

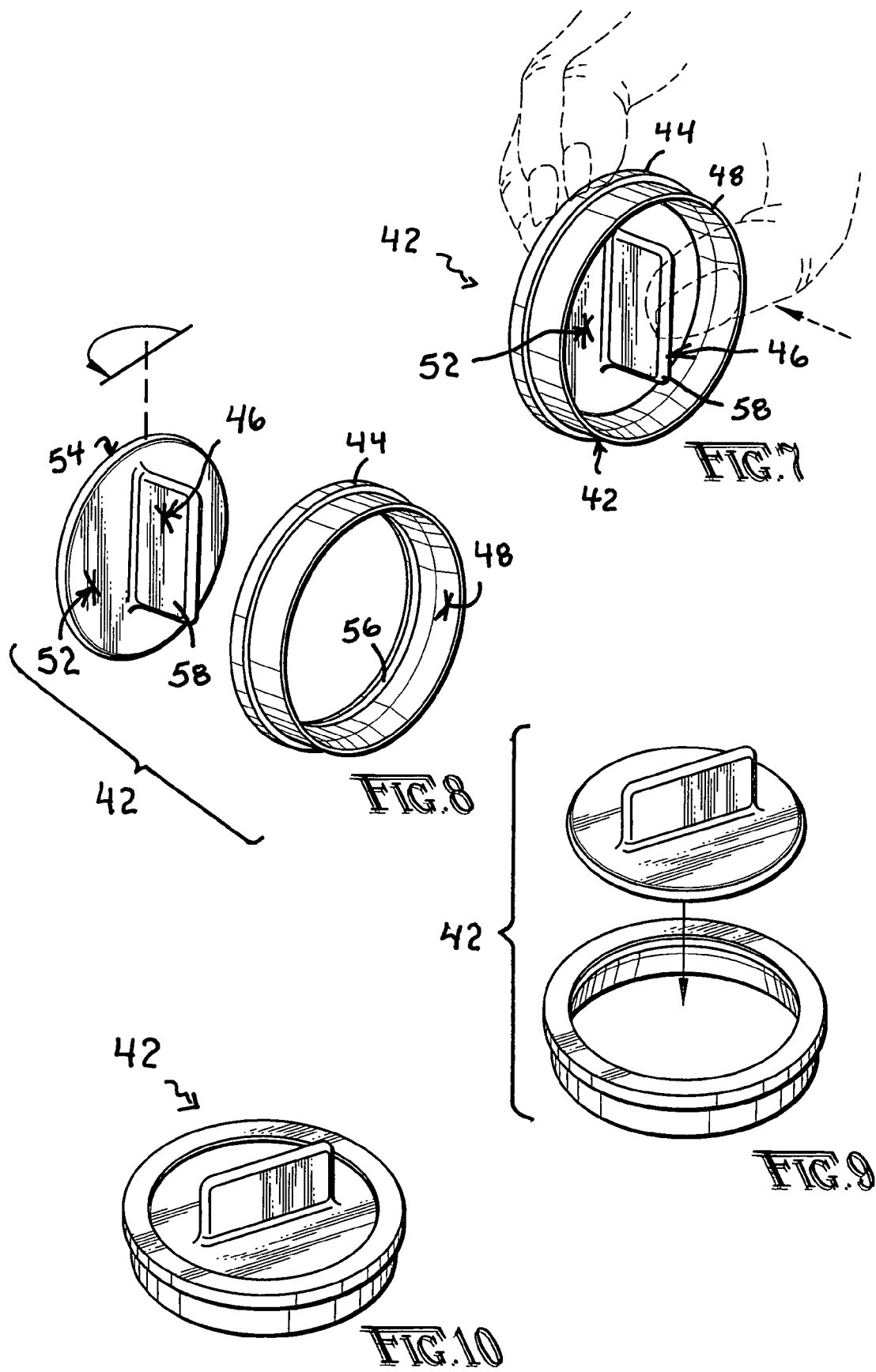

COILED DOUGH PACKAGE

BACKGROUND AND SUMMARY OF THE INVENTION

The invention relates to a coiled dough package, some aspect being more particular to its distribution and vending as an article in commerce, others to its end-destination domestic use.

It is an object of the invention to provide domestic shoppers/users with a grocery product that includes a spirally-wound up sheet of dough that is ready-to-bake as soon as taken out of its container and unwound flat.

It is another object of the invention to package the foregoing grocery product as combination of not only the ready-to-bake dough sheet but also with a versatile set of tools and/or edible complements all so that, in today's time squeezed world, domestic users can whip out home-baked items with minimal preparation time, minimal mess, and hence minimal clean-up time too.

It is alternate object of the invention to more particularly provide domestic users with a time-saving dough package that highly efficiently allows caretakers to make holiday cookies with children, allowing both parties to get quickly as possible to the fun stage of cutting out cookie forms from the dough sheet and then decorating the cookies forms with such edible complements as icing, sprinkles, chocolate or nut bits and the like.

It is a further object of the invention to provide a dough package which eliminates so much of the conventional work of making holiday cookies as mixing up batter, rolling out dough and, also as well, the planning ahead and shopping for/buying all the other accessories which nowadays can only be bought separately but are usually desired to have on hand and complete the traditional family experience holiday-cooking making.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

FIG. 7 is a perspective view of containment tube's end cap as shown in FIG. 6 except showing a domestic user's fingers in dashed line to illustrate conversion of the end cap as shown into alternately a cookie cutter in accordance with the invention and a rotational rolling pin handle in accordance with the invention;

FIG. 8 is a perspective view comparable to FIG. 7 except showing the outer collar and rotational center disassembled;

FIG. 9 is a perspective view comparable to FIG. 8 except showing the rotational center flipped around relative to the outer collar in preparation for re-assembly;

FIG. 10 is a perspective view comparable to FIG. 9 except showing the rotational center and outer collar re-assembled.

DETAILED DESCRIPTION OF THE PREFERRED EMBODIMENTS

Figure 1:
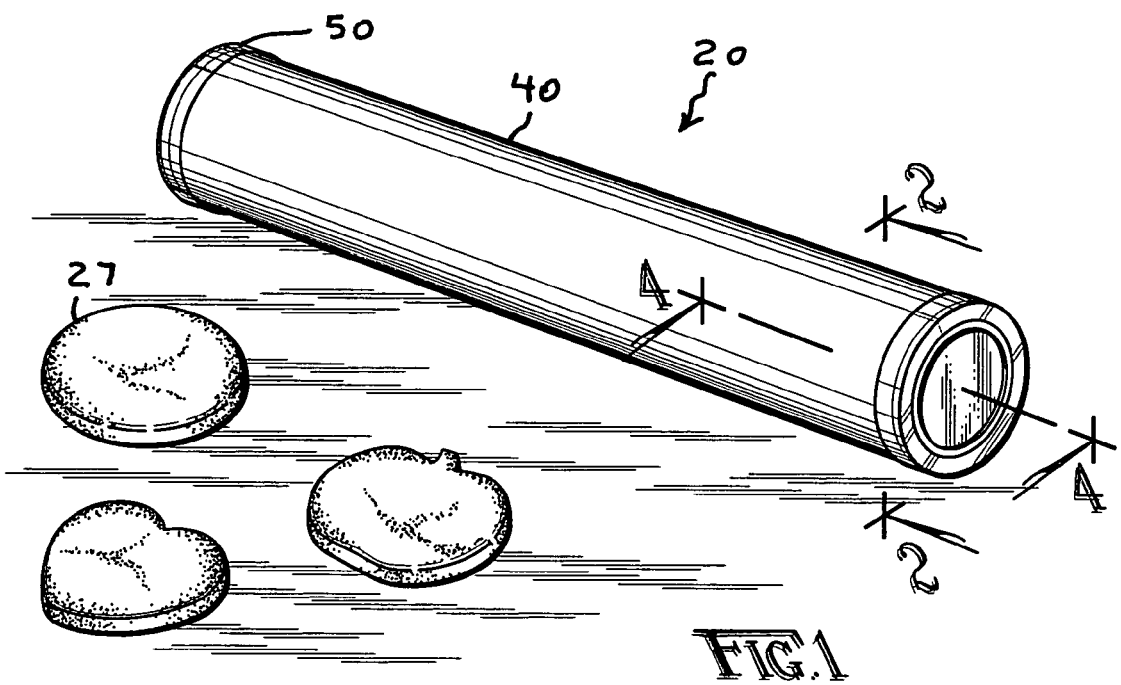
FIG. 1 is a perspective view of a dough package in accordance with the invention, and as shown more particularly packaged for its distribution and vending as an article of commerce, wherein several different forms of cookies are shown to illustrate example operative domestic uses of or creations from the dough package in accordance with the invention.
Figure 3:
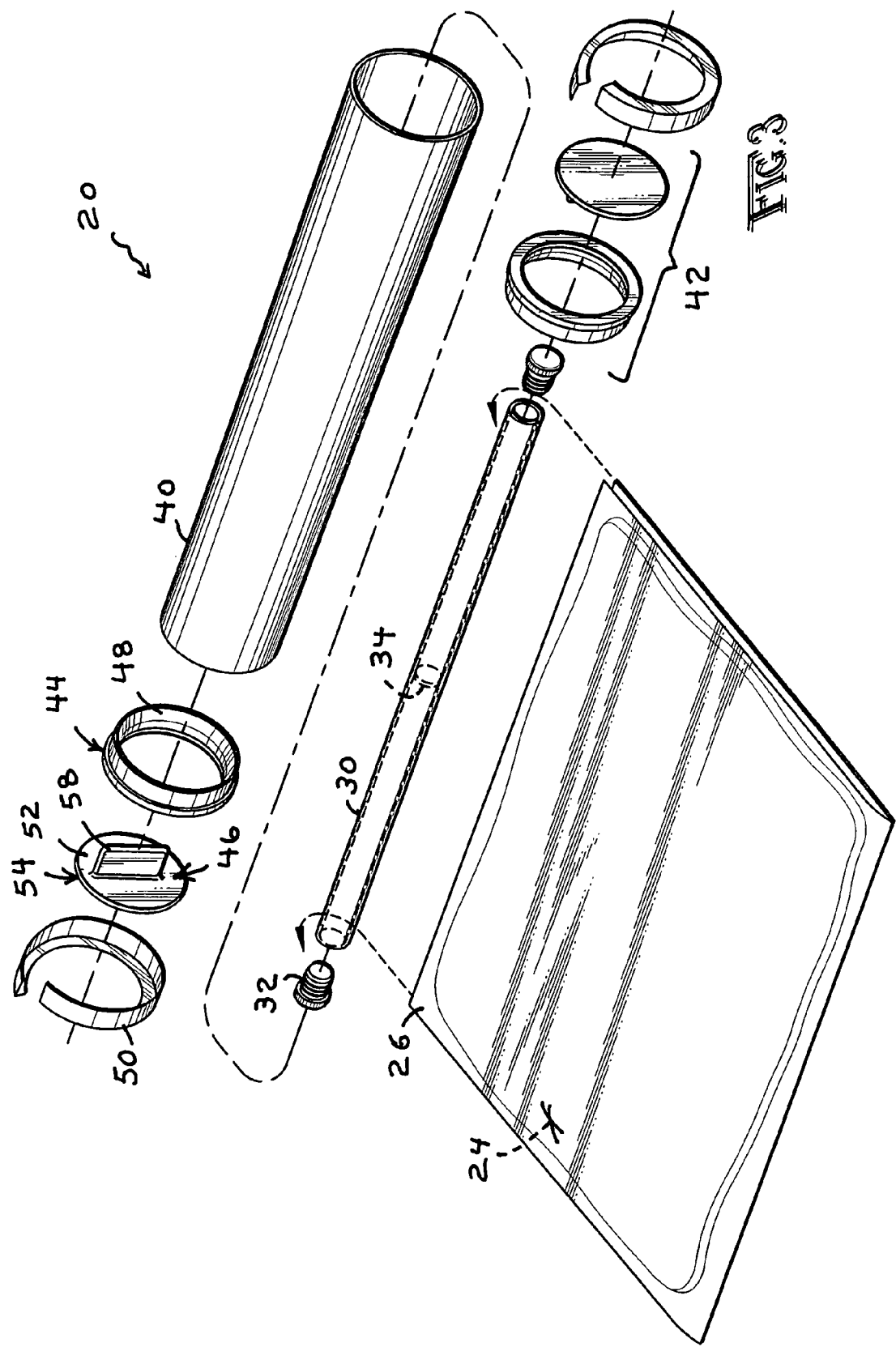
FIG. 3 is an exploded perspective view of the dough package of FIG. 1.

FIGS. 1 and 3 show a dough package 20 in accordance with the invention. In FIG. 1, the dough package 20 is shown fully bundled up for its distribution and vending as an article of commerce. In contrast, FIG. 3 shows the dough package 20 all taken apart to illustrate one example set of components that disassemble from the package of FIG. 1. Moreover, FIG. 1 shows example three cookies 27 in various shapes, including plain round, or heart shaped, or a flat pumpkin outline and so on.

Figure 2:
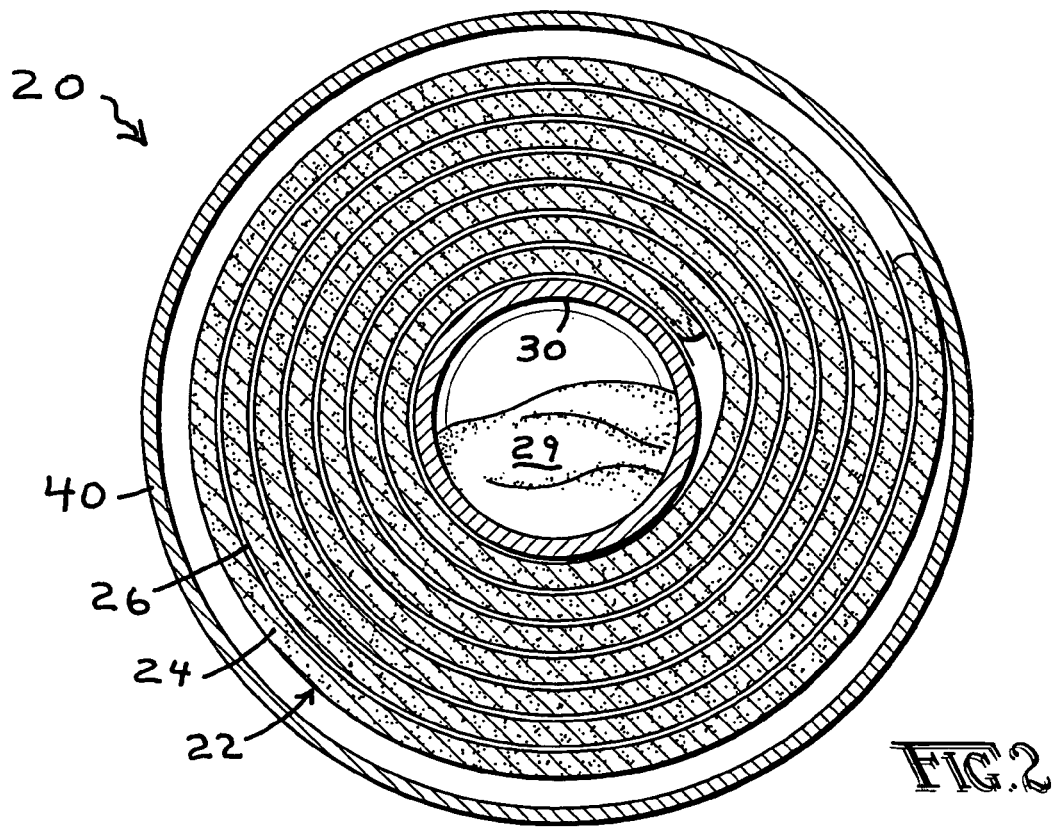
FIG. 2 is a partial sectional view taken along line 2-2 in FIG. 1.

To turn away briefly from FIG. 3 and visit FIG. 2, it shows that the dough package 20 of FIG. 1 as fully bundled up for commerce comprises the following general aspects. That is, the dough package 20 comprises a spiral assembly 22 of a sheet of dough 24 with an interleaved sheet of a non-adhesive separator media 26 cooperatively wound around a center tube 30, all snugly arranged inside an outer containment tube 40.

The recipe of the dough sheet 24 is a matter of choice for the marketer/manufacturer and depending on the target end-destination use for the ultimate bakery goods. For instance, if the dough package 20 is designed for a holiday-cookie making end use, then the dough recipe will be a cookie dough of one type or another. Alternatively, the dough recipe might be something else, such as some other pastry, crust, biscuit, crepe, bread, roll, doughnut or pancake recipe and the like, and without limitation. Depending on which recipe for the dough (including batter or whatever), the dough package 20 can be commercially distributed either frozen or refrigerated if and as necessary.

FIG. 2 also shows that the center tube 30's hollow core offers use as a compartment for supplying domestic users with modest supplies of edible complements 29 to their dough creations. For example, in the instance of making holiday cookies 27, such edible complements 29 might include without limitation icing, confectionary products as sprinkles and chocolate bits and so on, or agricultural products as nut/coconut bits and the like.

FIG. 3 shows that the center tube 30 has opposite open ends that can be sealed closed or re-opened by reusable end caps 32. Hence the center tube 30's hollow core forms a compartment for containing a pre-stocked supply of such edible complements 29. Either one of the end caps 32 can be removed and the center tube can be handled as a salt shaker to allow the shaking out of granulated bits (or pour or withdrawal of whatever such edible complements 29 is in there). If any of the original stock is left over, the center tube 30 can simply be re-capped and the edible complements 29 can be store there indefinitely. FIG. 3 additionally shows that the center tube 30's hollow core might be partitioned by an intermediate partition 34. This partition 34 forms divides the hollow core into two compartments instead of one. That way, if such edible complements 29 as sprinkles are pre-stocked loosely in the compartments (eg., as shown in FIG. 2), one compartment may be pre-stocked with black sprinkles only as the other might only be pre-stocked with saffron-colored sprinkles for conformance with the color theme of a particular holiday, as a Halloween.

Staying in FIG. 3, another function of the center tube 30 is to operate as a winding core for winding up the spiral assembly 22 of dough sheet 24 and non-adhesive separator media sheet 26. FIG. 3 shows the dough and non-adhesive separator sheets 24 and 26 stretched out flat. At some original time there is a food-process production line (not illustrated) which creates the spiral assembly 22 as wound on the center tube 30. Such is when the following objects are achieved. For one, the original dough mass is formed into a flat film of preferably a uniform thickness all over. One sheet 24 of the greater dough film is cut to size and laid out over a sheet 26 of the non-adhesive separator media. Candidate media suitable for the purpose include without limitation wax paper or flour-dusted cellophane, as well as many more candidate media, and so on.

It is an inventive aspect of the dough package 20 in accordance with the invention that it utilizes sheet 26 of separator media that is roughly twice the size of the sheet 24 of dough. Preferably, the sheet 26 of separator media is not just merely twice the size, but includes a little bit oversize around the margins. One purpose for double-sizing the sheet 26 of separator media is, that is can be folded in about half to form two flaps, and the dough sheet 24 can be disposed inside the folded flaps like a sheet of paper filed in a file folder. This folded-over configuration provides more than one advantage. For starters, it provides double assurance that the dough sheet 24 will not contact something else, such as the center tube 30, and stick to such during the time the dough package 20 is distributed and vended as an article of commerce.

Figure 5:
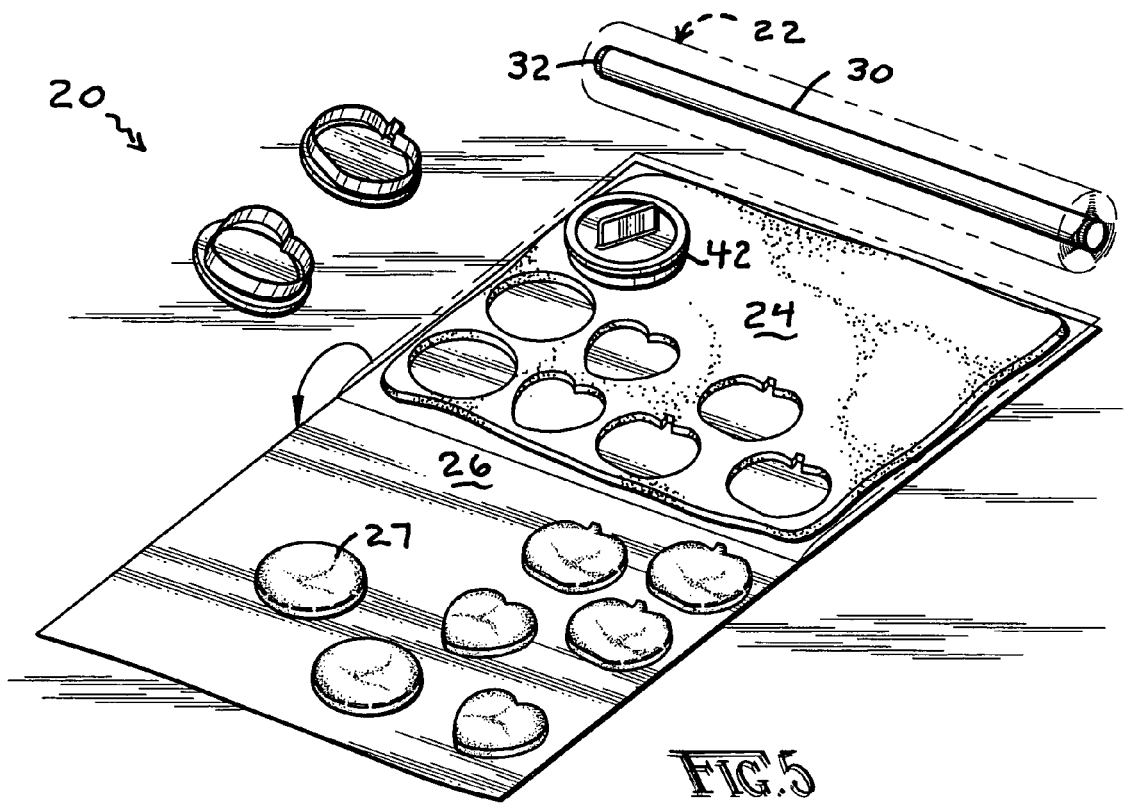
FIG. 5 is a perspective view showing the spiral assembly of FIG. 2 or 4 unwound on top of a flat work surface, wherein the depicted cookie cutters in accordance with invention are capable of cutting out the cookie forms from the dough sheet in accordance with the invention and setting out on the extra flap of the non-adhesive separator media in accordance with the invention.

FIG. 5 shows better another advantage of the folded-over configuration of the separator media sheet 26. That is, during domestic use, after the spiral assembly 22 is unwound across a flat work surface, the upper flap of the sheet 26 can be folded out and thereafter provide extra working space. As FIG. 5 shows, cookie forms 27 being cut out of the dough sheet 24 as it rests on sheet 26's lower flap are being set aside on the folded-out upper flap. Also, after the cookie forms 27 are baked, they can all be set back onto the double-sized sheet 26 of separator media to cool. It is known that when cookies bake they grow a little. Hence if the sheet 26 of separator media were roughly the same size as the original dough sheet 24, the growth of the baked cookies would disallow fitting them all onto such a small footprint. And in any event, because of the circular-like shapes of the cookies 27, they would not readily allow such close packing together to fit on such a small footprint in any event. Hence it is more advantageous to provide domestic users with ample space to work and by way of providing a generously over-sized sheet 26 of non-adhesive separator media.

Figure 4:
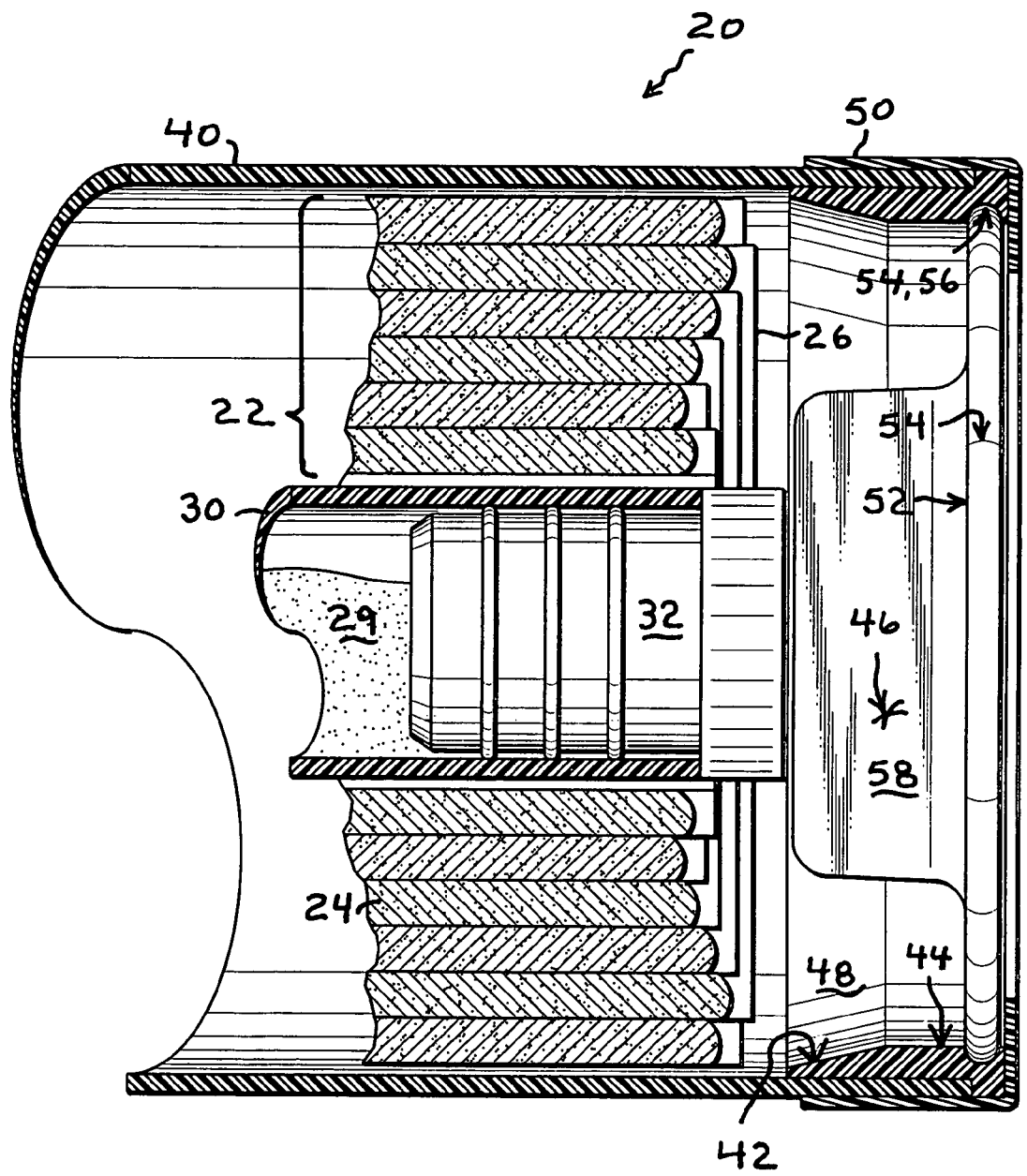
FIG. 4 is a partial sectional view, with end portions broken away, taken along line 4-5 in FIG. 1.

FIGS. 2 and 4 show the appearance of the spiral assembly 22 when it is all wound up on the center tube 30. FIGS. 2 and 4 also shows that the spiral assembly 22 (with center tube 30) are arranged to fit snugly inside the outer containment tube 40.

FIGS. 3 and 4 show that the outer containment tube 40 has opposite open ends that are opened and closed by re-usable end cap assemblies 42. Each end cap assembly comprises an outer collar 44 and an inner rotational center 46. Preferably the outer collar 44 includes a skirt portion 48 as more particularly described below. The rotational center 46 has a main disk portion 52, which main disk portion 52 that has a circular periphery 54. The outer collar 44 has a circular inner track 56 that allows the disk portion 52's circular periphery 54 to be press-fitted therein, and once there, afford relative rotational movement between the outer collar 44 and rotational center 46. Each rotational center 46 furthermore includes a rolling-pin handle formation 58. The rolling-pin handle formation 58 projects axially away from its origin the disk portion 52 to its own end as shown.

Figure 6:
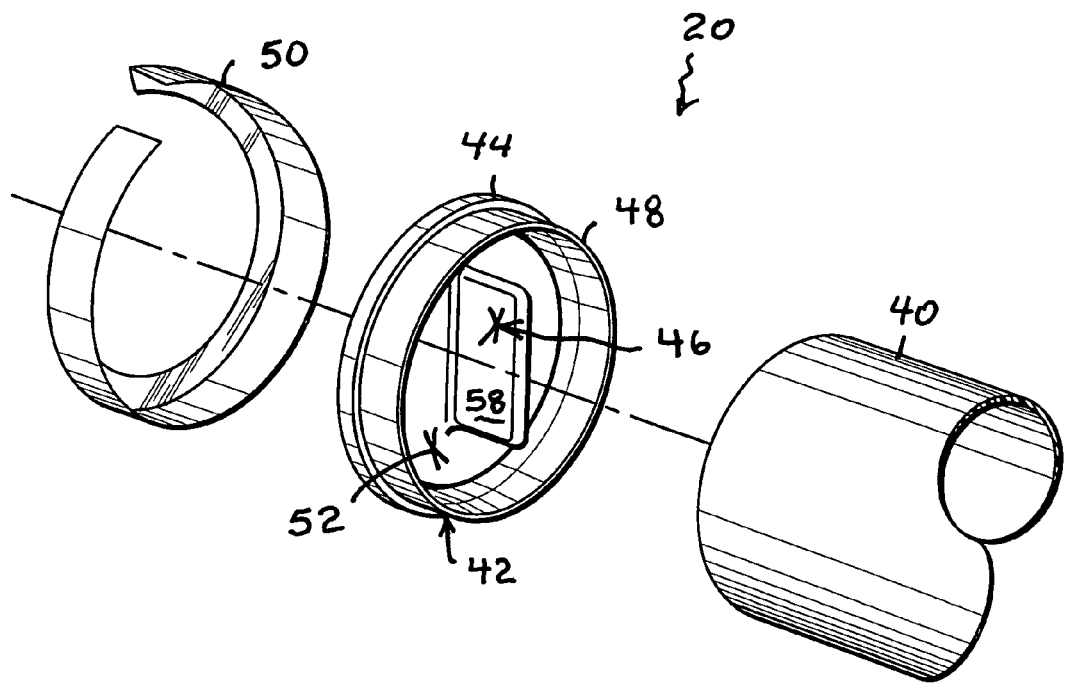
FIG. 6 is an exploded detail taken from the upper left part of FIG. 3 except the containment tube's end cap in accordance with the invention is shown assembled from its component parts of an outer collar in accordance with the invention and a rotational center handle in accordance with the invention.
Figure 11:
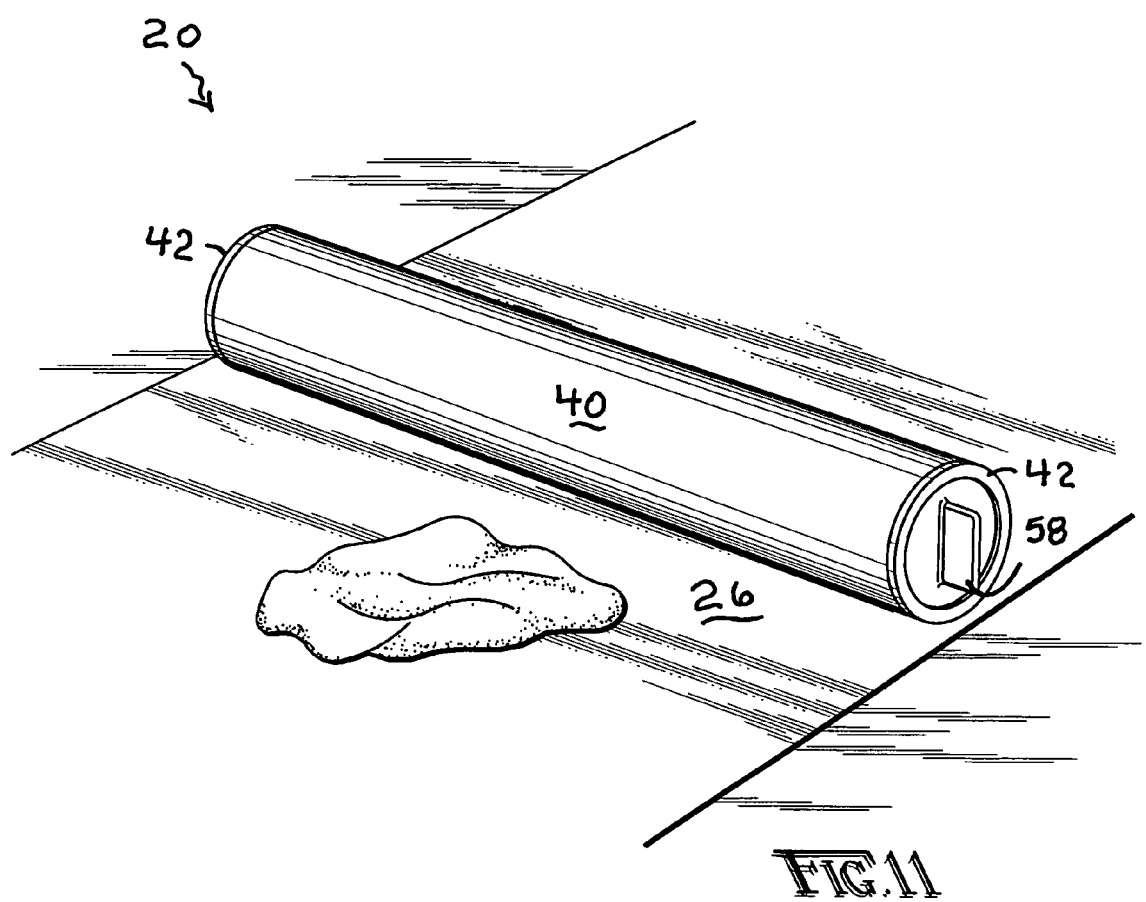
FIG. 11 is a perspective view showing the re-assembled end cap of FIG. 9 and its like opposite counterpart re-coupled to the containment tube for completing its conversion into a rolling pin in accordance with the invention.

In FIG. 3, the end cap assemblies 42 are shown disassembled. FIG. 6 is a detail view comparable to what is shown in the upper left quarter of FIG. 3 except that the end cap assembly 42 is re-assembled/assembled with its component parts, namely the outer collar 44 and the rotational center/handle 46/58. FIGS. 7 through 11 are a progression of views showing how to convert the end cap assembly 42 as shipped in commerce for distribution and vending (as shown in, eg., FIG. 6) into a cookie cutter as shown in FIG. 5 or a rolling pin handle as shown by FIG. 11. Accordingly, the end cap assemblies 42 have multiple uses.

FIG. 7 shows a domestic user's fingers in dashed line to illustrate manipulating the end cap assembly 42 at the start of process of converting it into not only a rolling pin handle, but also, alternatively, a cookie cutter. FIG. 8 shows the outer collar 44 and rotational center 46 disassembled apart. FIG. 9 shows the rotational center 46 flipped about relative to the outer collar 44 in preparation for re-assembly. FIG. 10 is a shows the rotational center 46 and outer collar 44 re-assembled. Now, the handle formation 58 projects in the opposite axial direction relative to the collar 44's skirt 48. In this configuration, the end cap assembly 42 can serve as a cookie cutter for cutting out cookie forms 27 as shown in part by FIG. 5.

However, the collar 44's skirt 48 need not be strictly circular. FIG. 5 shows alternative endless hoop configurations for the collar 44's skirt 48. The alternative configurations include a heart-shaped skirt 48 as well as another skirt 48 shaped for cutting a cookie form 27 having a flat pumpkin outline. Persons ordinarily skilled in the art would readily recognize that there endless variations that can be incorporated here in accordance with the invention. It will be appreciated that the collar 44's skirt 48 need not be perfectly circular for sealing purposes. As FIGS. 4 and 6 show (among other views), air tight sealing is preferably accomplished by heat-shrinkable tubing-end cap wrapping bands 50. It only is preferred if the collar 44's skirt 48 is sized to make a wedging contact with the outer containment tube 40—not continuously around all 360°—but at sufficient enough spaced apart points to form a tight press fit.

To turn to FIG. 11, it shows the re-assembled end cap assembly 42 of FIG. 9 and its opposite counterpart re-coupled to the outer containment tube 40 for completing the containment tube 40's conversion into a rolling pin in accordance with the invention.

During the time the dough package 20 in accordance with the invention is an article of commerce during distribution and vending, it is preferred to have the handle formations 58 projecting axially in same direction as the collar 44's skirt 48. FIG. 4 shows better the reason this is preferred. That is, the handle formations 58 are preferably sized to abut against the end caps 32 of the center tube 30. This accomplishes more than one advantage. To begin with, the opposed clamping pressure of the opposite handles 58 longitudinally stabilizes the spiral assembly 22 in about the longitudinal middle of the outer containment tube 40 without worry of the spiral assembly 22's soft ends mashing against anything and deforming. Also, if the collar 44's skirt 48 is non-circular (eg., heart or pumpkin shaped &c.), the clearance provided by the stand-off enforced by the handles 58 abutting the center tube 30's end caps 32 allows the nesting of the non-circular skirt 48 without worry of it too mashing into a soft end of the spiral assembly 22 and causing deformation.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A dough package comprising:
    a sheet of dough and another sheet of a non-adhesive separator media cooperatively wound in a spiral assembly;
    a rigid, hollow, cylindrical container comprising spaced open ends and end portions adjacent each open end, wherein the rigid cylindrical container forms an open-ended cylinder whereby the spiral assembly can be snugly arranged therein, said rigid cylindrical container providing the soft spiral assembly with protection against deformation while said package is an article of commerce;
    a pair of container-end caps for the rigid cylindrical container;
    a cylindrical hollow center canister wherein the spiral assembly is wound around the cylindrical center canister while said package is an article of commerce;
    a pair of canister-end caps therefor to make an accessible storage compartment in the hollow center canister;
    each container-end cap comprising an outer collar and an inner rotational center; each outer collar being formed with a circular inner track and a hoop skirt portion wherein, during the time the dough package is an article of commerce during distribution and vending, the container-end caps being reusable by the hoop skirt portions press fitting into the end portions of the cylindrical container;
    each inner rotational center having a main disk portion having a circular periphery and further having on one side of the main disk portion a rolling-pin handle formation that projects axially away from its origin in the main disk portion;
    wherein each inner rotational center disassembles and re-assembles out of the respective circular inner track of the respective outer collar such that the handle formations are alternatively disposed inside the respective hoop skirt portions or oppositely thereof;
    wherein the handle formations are sized and arranged such that, during the time the dough package is an article of commerce during distribution and vending, the handle formations are disposed projecting axially in the same direction as the respective hoop skirt portions and are sized and arranged to abut against the canister-end caps of the center canister to provide opposed clamping pressure on the center canister in order to longitudinally stabilize the spiral assembly in about a longitudinal middle of the outer container;
    wherein the end cap assemblies are further arranged to be alternatively re-arranged and coupled to the cylindrical container with the handles flipped about and projecting axially outwards during rolling pin use.

2. The dough package of claim 1 wherein the sheet of the separator media is substantially more expansive than the sheet of dough and folded such that, during domestic use when the spiral assembly is unwound on a relatively flat work surface, the dough sheet will be automatically presented substantially wholly situated within a perimeter of the separator media sheet, and folding out the folded portion or portions of the separator media sheet will provide a covering over the work surface as well as thereafter provide extra working space for dough pieces taken out of the dough sheet.

3. The dough package of claim 2 wherein the separator media sheet is more than twice as expansive as the dough sheet.

4. The dough package of claim 3 wherein the separator media sheet is folded in about half into two flaps in the spiral assembly.

5. The dough package of claim 4 wherein the dough sheet is interleaved between the two flaps of the folded separator media sheet in the spiral assembly.

6. The dough package of claim 1 wherein each skirt portion has a terminal edge such that during domestic use the terminal edge thereof can be applied as a cookie cutter to the dough sheet to cut out cookie forms.

7. The dough package of claim 6 wherein the hoop skirt portion is arranged to cut out non-cylindrical cookie forms including any of a flat heart shape, a flat pumpkin outline or other non-cylindrical forms.

8. The dough package of claim 6 wherein said hoop skirt portion further comprises a generally circular disk joined to said hoop skirt portion.

9. The dough package of claim 1 wherein the rigid container includes an elongated cylindrical sidewall sized in part for having the spiral assembly snugly arranged therein while said package is an article of commerce and then in other part for operating as a rolling pin for rolling out dough during domestic use.

10. The dough package of claim 1 wherein the inner rotational centers of the container-end caps revolve relative to the outer collars therefor such that the handle formations thereof allow independent revolution of the cylindrical container.

11. The dough package of claim 1 wherein the hoop skirt portions are non-circular and make a wedging contact with the cylindrical container's open end portions, not continuously around all 360°, but at sufficient enough spaced apart points to form a tight press fit wherein the handle formations are sized and arranged such that, during the time the dough package is an article of commerce during distribution and vending the handle formations abut the center canister's canister-end caps in order to longitudinally stabilize the spiral assembly.

\* \* \* \* \*